United States Patent [19]

McCreedy et al.

[11] Patent Number: 4,493,927
[45] Date of Patent: Jan. 15, 1985

[54] CONDENSATION POLYMERS OF SULFUR COMPOUNDS AND NORBORNENYL COMPOUNDS

[75] Inventors: Kathleen M. McCreedy, Midland; Kenneth R. Hilton, Harrison, both of Mich.

[73] Assignee: The Dow Chemical Company, Midland, Mich.

[21] Appl. No.: 564,522

[22] Filed: Dec. 22, 1983

[51] Int. Cl.³ .............................................. C08G 75/00
[52] U.S. Cl. ..................................... 528/381; 528/388
[58] Field of Search ................................ 528/388, 381

[56] References Cited

U.S. PATENT DOCUMENTS

| 2,395,452 | 2/1946 | Bruson | 260/410 R |
|---|---|---|---|
| 3,586,700 | 6/1971 | Kurtz et al. | 260/327 |
| 3,882,031 | 5/1975 | Askew et al. | 252/47 |
| 4,012,331 | 3/1977 | Jayne et al. | 252/45 |
| 4,178,433 | 12/1979 | Smith | 528/381 |

OTHER PUBLICATIONS

Sorenson et al., Preparative Methods of Polymer Chemistry, Interscience Publishers, NY, pp. 185–186, (1968), 2nd ed.
Tobolsky et al., Polymeric Sulfur and Related Polymers, Interscience Publishers, NY, pp. 34–39.

*Primary Examiner*—Melvyn I. Marquis

[57] ABSTRACT

Condensation polymers having sulfur containing backbones exhibit high char formation properties. Polymers are prepared, for example, by reacting sodium tetrasulfide and dicyclopentadiene dichloroacetate under polymerization conditions.

11 Claims, No Drawings

CONDENSATION POLYMERS OF SULFUR COMPOUNDS AND NORBORNENYL COMPOUNDS

BACKGROUND OF THE INVENTION

The present invention relates to novel condensation polymers having sulfur in the polymer backbone.

Organic compounds containing sulfur are well-known in the art, and exhibit a wide variety of desirable properties. See, for example, *Preparative Methods of Polymer Chemistry*, 2nd Ed., Wayne Sorenson and Tod Campbell, page 183, Interscience Publishers, 1968. See also page 36–37 of *Polymeric Sulfur and Related Polymers*, Arthur Tobolsky and William MacKnight, 1965, published by John Wiley and Sons, Inc. In particular, polymers containing bicyclic organic compounds and sulfur are prepared for use as films or coatings as taught in U.S. Pat. No. 3,586,700. Unfortunately, such polymers exhibit poor char formation properties. In addition the pendant bicyclic compound is connected to the polymer backbone through two bonds, yielding a product which does not exhibit good flexibility.

In view of the deficiencies of the prior art, it would be highly desirable to provide a polymer having sulfur in its backbone which is easily prepared using readily available starting materials, and which exhibits excellent char formation properties and a wide range of glass transition temperatures.

SUMMARY OF THE INVENTION

The present invention is a condensation polymer comprising the product of (1) a sulfide salt containing from 1 to about 5 sulfur atoms and (2) a dihaloacetate substituted compound having alicyclic unsaturation in an amount sufficient to improve the high temperature char of the polymer when said polymer is subjected to a heat source; and wherein said polymer comprises a backbone containing carbon atom(s) alternating with sulfur atom(s) in recurring units.

This invention provides the skilled artisan with a method for preparing improved condensation polymers. The polymers of this invention are useful in a wide variety of applications where polymers having high char formation properties are useful. The polymers of this invention can be useful in preparing films, molded articles, and the like.

DETAILED DESCRIPTION OF THE INVENTION

Compounds having alicyclic unsaturation are most preferably the norbornenyl compounds. It is believed that the excellent char properties exhibited by the polymers of this invention are a result of the alicyclic unsaturation which can provide a source of crosslinking species at high temperatures. In this regard, the substituent unsaturation can come from varying sources.

Norbornenyl compounds of this invention include norbornadiene, dicyclopentadiene, cyclopentadiene trimers, and many of the alicyclic compounds disclosed in U.S. Pat. No. 3,586,700. The preferred norbornenyl compound is dicyclopentadiene. It is critical that a point of unsaturation remain in the resulting diahaloacetate modified norbornenyl compounds.

Sulfide salts of this invention are preferably polysulfide salts. Such salts are preferably alkali metal salts which can be represented by the formula:

$$Na_2S_x$$

wherein x is from 1 to about 5, preferably 1 to 4, most preferably from 2 to 3.

Dihaloacetate substituted norbornenyl compounds are prepared by contacting, for example, dichloroacetic acid with the desired norbornenyl compound in the presence of a catalyst. An addition reaction occurs between the carboxylic acid moiety and the unsaturation of the norbornenyl compound to yield the acetate functionality.

The condensation polymers of this invention are prepared by contacting the dihaloacetate substituted compound with the sulfide salt under conditions sufficient to lead to the formation of a condensation polymer. Preferably, the condensation polymers of this invention are prepared by dispersing a dihaloacetate substituted compound in a suitable solvent which can also contain a suitable surfactant. Preferably, the reaction is carried out under inert atmosphere such as nitrogen. The mixture is subjected to reaction conditions and the sulfide salt is contacted with the mixture. The mixture is subjected to reaction conditions until the reaction is complete. The mixture can be cooled and filtered. To the solution is added concentrated acid which causes the polymer product to precipitate. The product is isolated using known techniques.

The polymers of this invention are most advantageously represented as follows:

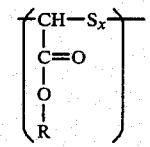

wherein x is as previously defined and R is the remaining portion of the norbornenyl moiety. That is the number of sulfur atoms in each recurring unit of the polymer backbone can vary from 1 to 5, preferably 1 to 4, most preferably 2 to 3. Increasing the number of sulfur atoms in the polymer backbone leads to an increase in the char formation properties of the polymer as well as an increase in glass transition temperature.

The following examples are illustrative embodiments and should not be construed as limiting its scope.

EXAMPLE 1

(A) Preparation of dicyclopentadiene dichloroacetate

Into a 1000 ml flask is charged 300 g of dichloroacetic acid and 5.8 g of 50 percent sulfuric acid. The mixture is heated to 75° C. Over a one hour period is continuously added 322 g of dicyclopentadiene. The temperature of the mixture is then increased to 95° C. and heating is continued for 5 hours. The mixture is cooled, washed with water, and with a dilute solution of sodium bicarbonate until a neutral pH is obtained. The washed product is vacuum distilled at 130° C.

(B) Preparation of Sodium Tetrasulfide

Into a flask is charged 100 g water, 96 g of an aqueous sodium sulfide solution and 37.5 g sulfur. The sample is heated and stirred under reflux at 95° C. for 1 hour. The resulting solution contains about 29.4 percent solids.

(C) Preparation of Polymer of This Invention

Into a flask is charged 10 g of the dicyclopentadiene dichloroacetate prepared in part (A) of this example, 90 g of dimethylformamide and 4 drops of an aqueous solution of the sodium salt of dodecyclated sulfonated phenyl ether (surfactant). The mixture is continuously stirred and sparged with nitrogen. About 20 ml of the sodium tetrasulfide solution of part (B) of this example is dried and redissolved in dimethylformamide and added to the mixture. This mixture is heated at 150° C. for 4 hours.

The mixture is allowed to cool and the resulting precipitate is filtered, and discarded. To the solution is added concentrated hydrochloric acid. The precipitate is filtered, washed with water, and dried in vacuum at 70° C. About 7 g of the product is recovered. This Sample is designed as Sample No. 1.

The product has a broad glass transition temperature (i.e., 50° C. to 110° C.) when measured using a differential scanning calorimeter. The limiting oxygen index is 0.24 as determined by ASTM D-2863-74. Elemental analysis indicates that the product is 29.3 percent sulfur, indicating that there are about 2.5 sulfur atoms per dicyclopentadiene acetate moiety. Char data concerning the product is presented in Table I.

(D) Preparation of Polymer of this Invention

Into a flask is charged 10 g of the dicyclopentadiene dichloroacetate prepared in part (A) of this example, 110 g dimethylformamide and 4 drops of an aqueous solution of the sodium salt of dodecylated sulfonated phenyl ether. The mixture is stirred and sparged with nitrogren. About 3 g of anhydrous sodium sulfide ($Na_2S$) is added to this invention. The mixture is heated to 150° C. for 4 hours.

The mixture is allowed to cool and the resulting precipitate is filtered, and discarded. To the solution is added concentrated hydrochloric acid. The precipitate is filtered, washed with water, and dried in vacuum at 70° C. About 5 g of the produce is recovered. The Sample is designated as Sample No. 2.

The product has a broad glass transition temperature (i.e, 10° C. to 40° C.) when measured using a differential scanning calorimeter. Elemental analysis indicates that the product is 9.4 percent sulfur, indicating that there is about 1 sulfur atom per dicyclopentadiene acetate moiety. Char data concerning the product is presented in Table I.

(E) Preparation of Polymer of this Invention

A mixture of dicyclopentadiene, dimethylformamide and surfactant is prepared as described in part (C) of this example. The mixture is continuously stirred, charged with nitrogen and heated to 130° C. About 20 ml of the sodium tetrasulfide solution of part (B) of this example is added to the mixture. The steam is alled to vent and the reaction mixture is held at 130° C. for 4 hours.

The sample is recovered as described in part (C) of this example. This Sample is designated as Sample No. 3. The product is 19.9 percent sulfur, indicating that there are about 1.5 sulfur atoms per dicyclopentadiene acetate moiety. Char data concerning the product is present in Table I.

TABLE I

| Sample | Product Char[1] 400° C. | 700° C. |
|---|---|---|
| No. 1 | 55 | 36–38 |
| No. 2 | 29 | 19 |
| No. 3 | 39 | 29 |
| C-1* | — | <1 |
| Polystyrene* | <2 | 0 |

*Not an example of the invention.
[1]Determined by thermogravimetric analysis. Sample C-1 is a polymer prepared as per Example 17 of U.S. Pat. No. 3,586,700

The data is Table I indicates that the products prepared in this example exhibit high char formation properties.

What is claimed is:

1. A condensation polymer comprising the product of a (1) sulfide salt containing from 1 to about 5 sulfur atoms and (2) a dihaloacetate substituted compound having alicyclic unsaturation in an amount sufficient to improve the high temperature char of the polymer when said polymer is subject to a heat source; and wherein said polymer comprises a backbone containing carbon atom(s) alternating with sulfur atom(s) in recurring units.

2. A polymer of claim 1 wherein said compound having alicyclic unsaturation is a norbornenyl compound.

3. A polymer of claim 2 wherein the norbornenyl compound is dicyclopentadiene.

4. A polymer of claim 1 wherein the sulfide salt is sodium tetrasulfide.

5. A polymer of claim 1 wherein the number of sulfur atoms in each recurring unit of the polymer backbone varies from about 1 to about 4.

6. A polymer of claim 1 wherein the number of sulfur atoms in each recurring unit of the polymer backbone varies from about 2 to about 3.

7. A polymer of claim 1 comprising recurring unit represented by the structural formula:

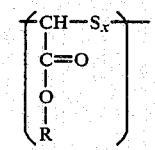

wherein x is from 1 to about 5 and R is the remaining portion of a norbornenyl moiety.

8. A polymer of claim 7 wherein the sulfur atoms in the polymer backbone are present in sufficient amounts to increase the glass transition temperature of the polymer.

9. A polymer of claim 1 wherein said dihaloacetate substituted compound having alicyclic unsaturation is the product of a dichloroacetic acid and a norbornenyl compound.

10. A polymer of claim 9 wherein said norbornenyl compound is dicyclopentadiene.

11. A polymer of claim 1 wherein the dihaloacetate substituted compound having alicyclic unsaturation is an addition product of the carboxylic acid moiety of dichloroacetic acid and the unsaturation of the norbornenyl compound.

* * * * *